(12) United States Patent
Yoon

(10) Patent No.: US 12,308,467 B2
(45) Date of Patent: May 20, 2025

(54) BATTERY MODULE INCLUDING COOLANT JET SPRAY NOZZLES WITH DIFFERENT MELTING POINT METAL VALVES, AND BATTERY PACK AND VEHICLE INCLUDING SAME

(71) Applicant: LG Energy Solution, Ltd., Seoul (KR)

(72) Inventor: Doo-Han Yoon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 504 days.

(21) Appl. No.: 17/769,189

(22) PCT Filed: Jan. 13, 2021

(86) PCT No.: PCT/KR2021/000503
§ 371 (c)(1),
(2) Date: Apr. 14, 2022

(87) PCT Pub. No.: WO2021/246605
PCT Pub. Date: Dec. 9, 2021

(65) Prior Publication Data
US 2023/0275313 A1 Aug. 31, 2023

(30) Foreign Application Priority Data
Jun. 2, 2020 (KR) .................. 10-2020-0066431

(51) Int. Cl.
*H01M 50/383* (2021.01)
*H01M 10/653* (2014.01)
(Continued)

(52) U.S. Cl.
CPC ....... *H01M 50/383* (2021.01); *H01M 10/653* (2015.04); *H01M 10/6569* (2015.04); *H01M 50/211* (2021.01)

(58) Field of Classification Search
CPC ............ H01M 50/383; H01M 50/211; H01M 10/653; H01M 10/6569
(Continued)

(56) References Cited

U.S. PATENT DOCUMENTS

2008/0087446 A1 4/2008 Sitabkhan
2010/0136391 A1 6/2010 Prilutsky et al.
(Continued)

FOREIGN PATENT DOCUMENTS

CN 104466276 A * 3/2015
CN 205141093 U 4/2016
(Continued)

OTHER PUBLICATIONS

International Search Report for Application No. PCT/KR2021/000503 mailed Apr. 22, 2021, 2 pages.
(Continued)

*Primary Examiner* — Sean P Cullen
(74) *Attorney, Agent, or Firm* — Lerner David LLP

(57) ABSTRACT

There are provided a battery module configured to delay the occurrence of a fire in the event of thermal runaway of a battery cell in the battery module and a battery pack comprising the battery module. The battery module according to the present disclosure includes a module case, at least one battery cell disposed in the module case, at least two coolant jet spray nozzles to spray a jet of coolant into the module case, and coolant tanks connected to the coolant jet spray nozzles, wherein low melting point metal valves are mounted in inlets of the coolant jet spray nozzles respectively, and have different melting points for each nozzle.

10 Claims, 8 Drawing Sheets

(51) Int. Cl.
*H01M 10/6569* (2014.01)
*H01M 50/211* (2021.01)

(58) Field of Classification Search
USPC .......................... 429/82, 120, 156, 158, 159
See application file for complete search history.

(56) References Cited

U.S. PATENT DOCUMENTS

| | | | |
|---|---|---|---|
| 2011/0200856 | A1 | 8/2011 | Yasui et al. |
| 2018/0331336 | A1 | 11/2018 | Choi et al. |
| 2021/0020879 | A1 | 1/2021 | Lee |

FOREIGN PATENT DOCUMENTS

| | | | |
|---|---|---|---|
| CN | 108370075 A | | 8/2018 |
| CN | 109103539 A | | 12/2018 |
| CN | 208889812 U | | 5/2019 |
| CN | 209859996 U | | 12/2019 |
| EP | 0014786 A1 | * | 9/1980 |
| EP | 3333932 A1 | | 6/2018 |
| JP | H08107943 A | | 4/1996 |
| JP | 09161754 A | * | 6/1997 |
| JP | H09259940 A | | 10/1997 |
| JP | 2011254906 A | * | 12/2011 |
| JP | 5119302 B2 | | 1/2013 |
| JP | 2015220176 A | * | 12/2015 |
| JP | 2016092007 A | * | 5/2016 |
| JP | 2018133134 A | | 8/2018 |
| JP | 2019-508846 A | | 3/2019 |
| KR | 20110042119 A | | 4/2011 |
| KR | 20180006780 A | | 1/2018 |
| KR | 20180113809 A | | 10/2018 |
| KR | 20190085005 A | | 7/2019 |
| KR | 20200030966 A | | 3/2020 |
| KR | 102123684 B1 | | 6/2020 |

OTHER PUBLICATIONS

Extended European Search Report including Written Opinion for Application No. 21818189.9 dated Jan. 24, 2023, pp. 1-7.

* cited by examiner

BATTERY MODULE INCLUDING COOLANT JET SPRAY NOZZLES WITH DIFFERENT MELTING POINT METAL VALVES, AND BATTERY PACK AND VEHICLE INCLUDING SAME

CROSS REFERENCE TO RELATED APPLICATIONS

The present application is a national phase entry under 35 U.S.C. § 371 of International Application PCT/KR2021/000503 filed on Jan. 13, 2021 which claims priority to Korean Patent Application No. 10-2020-0066431 filed in the Republic of Korea on Jun. 2, 2020, the disclosure of which is incorporated herein by reference.

TECHNICAL FIELD

The present disclosure relates to a battery module and a battery pack comprising the same, and more particularly, to a battery module and a battery pack configured to delay the occurrence of a fire caused by thermal runaway in the battery module or the battery pack. The present disclosure also relates to a vehicle comprising the battery pack.

BACKGROUND ART

Recently, much attention is paid to secondary batteries as a source of power for electric vehicles (EVs) and hybrid electric vehicles (HEVs) proposed as an alternative to gasoline vehicles and diesel vehicles, which use fossil fuels, to solve the air pollution issue. To meet the high output and high capacity requirements, medium- and large-sized devices such as vehicles use battery modules including battery cells electrically connected to each other and medium- and large-sized battery packs including the battery modules as unit modules.

It is very important to ensure stability to the battery modules and battery packs including the secondary batteries. In particular, lithium secondary batteries used in electric vehicles require high energy density and high output in a short time, as well as a long shelf life of at least 10 years under severe conditions in which charging/discharging with large currents is repeated for a short time, and thus require much better safety and longer life than small-sized lithium secondary batteries.

However, in general, lithium secondary batteries use flammable nonaqueous electrolyte solutions, so short circuits may occur due to external impacts or dendrite grown by lithium ions at the negative electrode when overcharged. When a short circuit occurs, the temperature in the battery cell rises, and thermal runaway may occur when the temperature of the battery cell exceeds the threshold temperature. The thermal runaway is a chemical process that is accelerated in itself within the battery cell. When thermal runaway occurs in a battery cell, a safety issue arises such as explosion or fires which is caused by flammable gas produced by the decomposition reaction of the electrolyte solution, flammable gas produced by the reaction between the electrolyte solution and the electrode, and oxygen produced by decomposition of the positive electrode.

The thermal runaway generates a large amount of heat and gas until all available materials are used up, and the large amount of heat generated by the thermal runaway occurred in the corresponding battery cell may be transmitted to the neighboring battery cells. This sharply increases the temperature of the adjacent battery cells, and the thermal runaway spreads to the adjacent cells in a short time.

When a user fails to quickly respond to the thermal runaway occurring in the corresponding battery cell, it results in thermal runaway propagation and fires and explosions in the battery unit of higher capacity than the battery cells such as battery modules or battery packs, causing financial damage and safety problems.

Accordingly, the existing battery module has the thermal runaway prevention/protection function. Examples include the insulation design and the use of fuses for protecting from external impacts and preventing short circuits. However, there is a lack of measures for mechanically delaying the occurrences of fires after thermal runaway occurs in the battery cell disposed in the battery module.

DISCLOSURE

Technical Problem

The present disclosure is directed to providing a battery module for delaying the occurrences of fires in the event of thermal runaway of a battery cell in the battery module and a battery pack comprising the same.

The problem of the present disclosure is not limited to the above-described problem, and other problems not mentioned herein will be clearly understood by those skilled in the art from the following detailed description.

Technical Solution

To solve the above-described problem, a battery module according to the present disclosure includes a module case, at least one battery cell disposed in the module case, at least two coolant jet spray nozzles to spray a jet of coolant into the module case, and coolant tanks connected to the coolant jet spray nozzles, wherein low melting point metal valves are mounted in inlets of the coolant jet spray nozzles, respectively, and have different melting points for each nozzle.

The low melting point metal valves may include a first low melting point metal valve that melts when a first temperature is reached, a second low melting point metal valve that melts when a second temperature is reached and a third low melting point metal valve that melts when a third temperature is reached, and the first, second and third temperatures may be in a sequentially increasing order.

The low melting point metal valves may further include a fourth low melting point metal valve that melts when a fourth temperature higher than the third temperature is reached.

The coolant tanks may be separated for each nozzle and connected to the nozzles respectively.

The coolant may be a phase change liquid having insulating properties.

The battery cell may include, without limitation, any type of secondary battery capable of providing high voltage and high current to a battery module and a battery pack, and may include, for example, a lithium secondary battery capable of storing a large amount of energy per volume.

The battery cell may include a plurality of plate-shaped battery cells, and the plurality of plate-shaped battery cells may be stacked and arranged such that one or two surfaces are in contact with adjacent battery cells to form a battery cell assembly, each of the battery cells may include an electrode lead extended on one or two sides, and the battery cells may be stacked along a horizontal direction of the module case such that an edge where the electrode lead is not extended is placed down.

In particular, the plate-shaped battery cell may be a pouch type battery cell including an electrode assembly embedded in a battery case of a laminate sheet including a resin layer and a metal layer, sealed along the outer periphery of the battery case by heat melting.

In detail, the plate-shaped battery cell may be a pouch type battery cell including an electrode assembly including a positive electrode, a separator and a negative electrode and an electrolyte solution hermetically received in a battery case, and may have a plate shape of an approximately cuboidal structure having a small thickness to width ratio. In general, the pouch type battery cell includes a pouch type battery case, and the battery case has a laminate sheet structure including an outer coating layer made of polymer resin having high durability, a barrier layer made of a metal material capable of preventing the inflow of moisture and air, and an inner sealant layer made of polymer resin that melts when heated, stacked in that order. In the pouch type battery cell, the battery case may be formed in various structures.

The battery module may further include a thermally conductive adhesive interposed between an inner lower surface of the module case and a lower side of the battery cell assembly.

The module case may include a top plate to cover a top of the battery cell assembly, a bottom plate positioned opposite the top plate to cover a bottom of the battery cell assembly, and a pair of side plates coupled to the top plate and the bottom plate, and positioned on two sides of the battery cell assembly, and may have a first opening and a second opening which are open to two sides in a lengthwise direction of the battery cells, and the module case may further include a front cover coupled to the first opening of the module case and configured to cover a front side of the battery cell assembly, and a rear cover coupled to the second opening of the module case and configured to cover a rear side of the battery cell assembly.

To solve the above-described problem, a battery pack according to the present disclosure includes at least one battery module according to the present disclosure. That is, the present disclosure provides a battery pack including the battery module according to the present disclosure as a unit module. The battery pack may be manufactured by combining the battery modules as the unit modules according to a desired output and capacity, and when considering mounting efficiency and structural stability, the battery pack may be preferably used as a power source of electric vehicles, hybrid electric vehicles, plug-in hybrid electric vehicles and power storage systems (ESSs), but its application range is not limited thereto.

To solve the above-described problem, a vehicle according to the present disclosure includes at least one battery pack according to the present disclosure.

Advantageous Effects

According to the present disclosure, it is possible to achieve multiple coolant jet spray in response to the rising temperature. Thereby it is possible to achieve greater cooling. Accordingly, in the event of thermal runaway of a battery cell, it is possible to prevent the thermal runaway propagation and delay the occurrences of fires.

According to the present disclosure, it is possible to respond to the thermal runaway at the early stage when the thermal runaway occurs in the battery cell. Accordingly, it is possible to prevent the thermal runaway propagation rapidly and prevent fires.

The present disclosure lowers the temperature of the battery cell by multiple coolant jet spray without an electronic control unit when the temperature of the battery cell rises. As described above, the present disclosure provides a safety device capable of delaying the occurrences of fires in the event of thermal runaway of the battery cell disposed in the battery module. Accordingly, it is possible to remarkably improve the safety that has been pointed out as the problem of the conventional lithium secondary batteries, and in particular, the safety improvement effect is prominent in the battery module or the battery pack used in electric vehicles.

DETAILED DESCRIPTION

Figure 1:
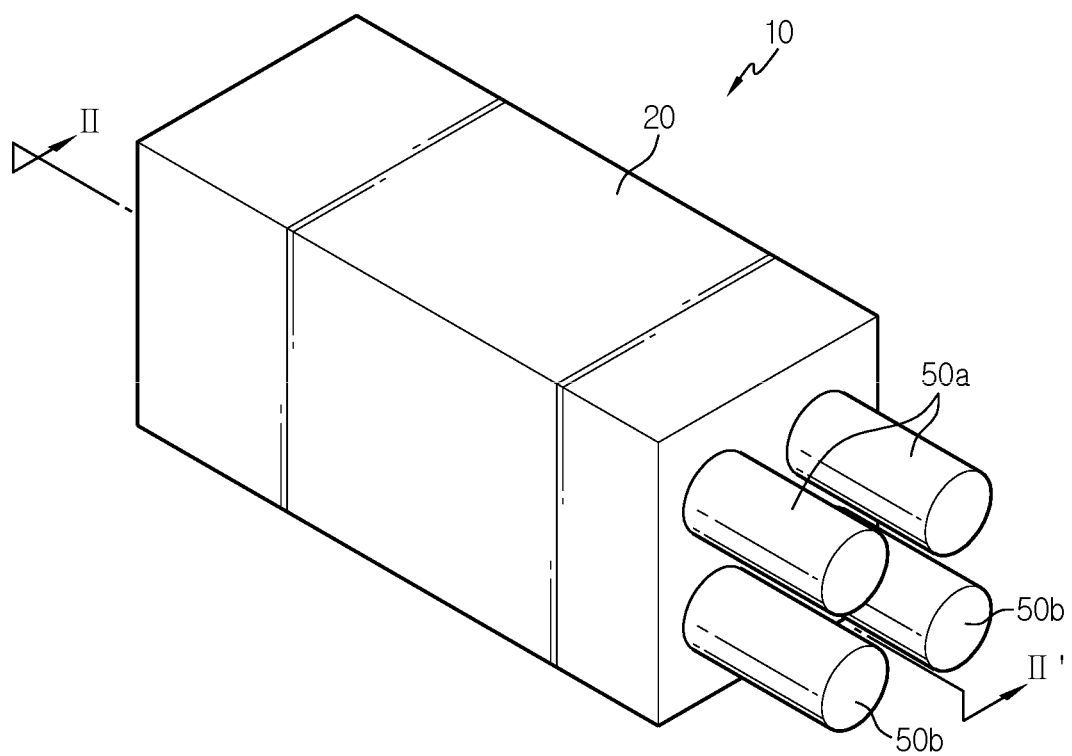
FIG. 1 is a schematic diagram of a battery module according to an embodiment of the present disclosure.

Hereinafter, the preferred embodiments of the present disclosure will be described in detail with reference to the accompanying drawings. Prior to the description, it should be understood that the terms or words used in the specification and the appended claims should not be construed as limited to general and dictionary meanings, but interpreted based on the meanings and concepts corresponding to the technical aspects of the present disclosure on the basis of the principle that the inventor is allowed to define terms appropriately for the best explanation. Therefore, the embodiments described herein and illustrations shown in the drawings are just a most preferred embodiment of the present disclosure, but not intended to fully describe the technical aspects of the present disclosure, so it should be understood that other equivalents and modifications could be made thereto at the time the application was filed.

Figure 2:
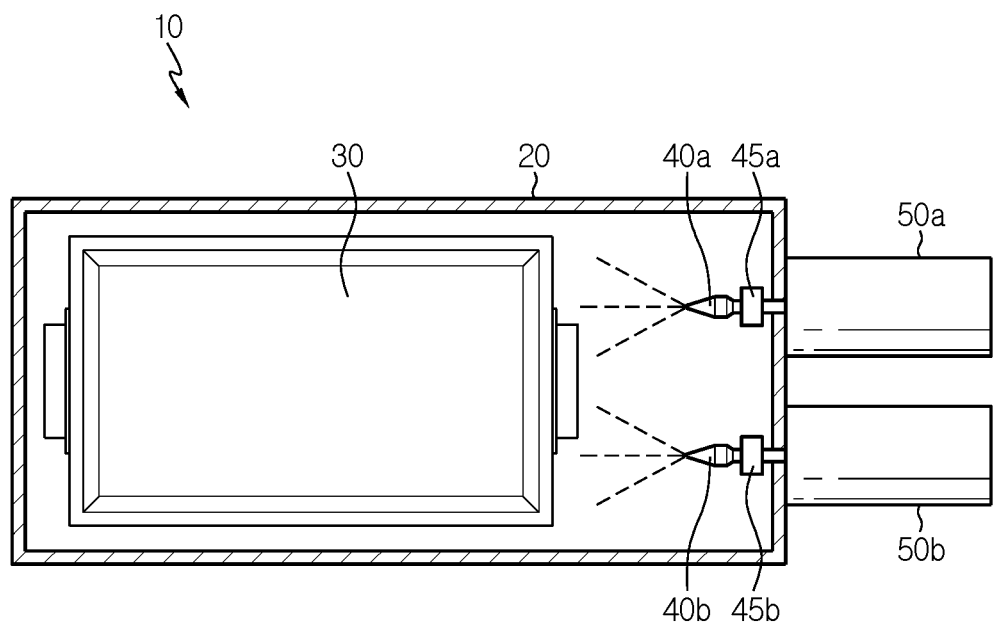
FIG. 2 is a cross-sectional view of FIG. 1 taken along the line II-II'.

FIG. 1 is a schematic diagram of a battery module according to an embodiment of the present disclosure. FIG. 2 is a cross-sectional view of FIG. 1 taken along the line II-II'.

Referring to FIGS. 1 and 2, the battery module 10 includes a module case 20 and at least one battery cell 30 disposed in the module case 20. The module case 20 may form the shape of the battery module 10, and receive the battery cell 30 therein. To this end, the module case 20 may have a space for receiving the battery cell 30. The module case 20 comes in various types and shapes.

The battery cell 30 may include, without limitation, any type of secondary battery capable of providing high voltage and high current to a battery module and a battery pack, and may include, for example, a lithium secondary battery capable of storing a large amount of energy per volume. The battery module 10 includes at least one battery cell 30, and preferably includes a plurality of battery cells 30. In this sense, preferably, the battery module is a 3-dimensional stack of battery cells 30 that allows simultaneous electrical connection of the battery cells 30. The battery cells 30 themselves or mounted in a cell cartridge may be stacked or arranged into a dense structure, and electrically connected to each other.

The battery module 10 of the present disclosure further includes at least two coolant jet spray nozzles 40a, 40b to spray a jet of coolant into the module case 20. One end of the coolant jet spray nozzles 40a, 40b is included in the module case 20. Coolant tanks 50a, 50b are connected to the other end of the coolant jet spray nozzles 40a, 40b. The coolant tanks 50a, 50b store the coolant, and may be disposed outside of the module case 20. In this embodiment, the coolant tanks 50a, 50b may be separated for each coolant jet spray nozzle 40a, 40b and connected to the coolant jet spray nozzles 40a, 40b respectively. Each of the coolant jet spray nozzles 40a, 40b may share the same coolant tank. However, when a predetermined temperature drop effect takes place after the first coolant jet spray, a configuration for hindering the additional jet spray of the coolant through the open coolant jet spray nozzles may be further necessary. In case that such a configuration is absent, the jet of coolant will be sprayed until the coolant in the coolant tanks connected to the open coolant jet spray nozzles is used up. An appropriate piping may be formed between the coolant tanks 50a, 50b and the coolant jet spray nozzles 40a, 40b.

The coolant may be a phase change liquid having insulating properties. For example, the coolant may be a liquid such as 3M™ Novec™.

The coolant may be a slurry including microcapsules containing the phase change material. The liquid component of the slurry first absorbs energy, and secondary energy absorption is possible through the phase change of the phase change material. For example, the phase change material may be at least one selected from the group consisting of paraffin, an inorganic salt, a salt hydrate, carboxylate and sugar alcohol.

When opened, each coolant jet spray nozzle 40a, 40b may be configured to spray the coolant onto the battery cell 30 in the module case 20, and a necessary number of coolant jet spray nozzles may be installed at a predetermined location to uniformly spray the jet of coolant onto the battery cell 30 in the module case 20. In the shown example, the coolant jet spray nozzles 40a, 40b are installed on the side of the battery module 10 to spray the jet of coolant to the side of the battery cell 30. In another example, the coolant jet spray nozzles 40a, 40b may be installed above the battery module 10. The coolant jet spray nozzles 40a, 40b have low melting point metal valves 45a, 45b in the inlets, respectively, and the melting points of the low melting point metal valves 45a, 45b are different for each nozzle.

The low melting point metal valves 45a, 45b include a low melting point metal, to be more exact, a low melting point alloy. Specifically, the low melting point metal refers to a metal having the melting point that is lower than those of common metals. In general, commercialized metal alloys below the melting point of Pb that melts at 327.4° C. correspond to the low melting point alloy. The melting point is different for each low melting point alloy manufacturer, but the melting point ranges from approximately 50° C. to 200° C. Examples of the low melting point alloy include Bi—Pb—Sn—Cd alloys that melt at 70-80° C. and Bi—Sn alloys that melt at 140-170° C. Recently, lower cadmium and lead-free materials that comply with the RoHS regulations are developed, so it is easy to select materials. For example, the low melting point metal valves may be manufactured using the low melting point alloys having the melting point of 60° C., 72° C., 78.8° C., such as U-60, U-72, U-78 from Asahi Metal. The low melting point alloys having various melting points may be available from Asahi Metal, and the low melting point alloys may be also available from Yamamoto Metal. These material suppliers are provided by way of example, and the present disclosure is not limited to the low melting point alloy manufacturers.

For example, the low melting point metal valve has a hollow valve stem, and the hollow region is closed with the low melting point metal, and when the ambient temperature rises, the low melting point metal melts into a liquid, the hollow is opened and the valve is brought into operation. Alternatively, a closure may be attached to the hollow region with the low melting point metal, and when heated, the low melting point metal melts, and the closure may be detached or removed from the hollow region. When the coolant in the coolant tanks 50a, 50b is placed in a compressed state, the compressed coolant may be sprayed from the coolant jet spray nozzles 40a, 40b to the battery cell 30 when the valve stem is opened. How the valves operate is provided by way of example, and the present disclosure is not limited to the detailed structure of the low melting point metal valves.

At lower temperatures than the melting point of the low melting point alloy, the low melting point metal valves 45a, 45b including the low melting point alloy are in a closed state; that is, the inlet of each coolant jet spray nozzle 40a, 40b is closed. When the temperature of the battery cell 30 rises and reaches the melting point of the low melting point alloy, the low melting point alloy melts and the low melting point metal valves 45a, 45b are opened, and the inlet of each coolant jet spray nozzle 40a, 40b is opened to spray the jet of coolant into the battery module 10.

In this instance, since the low melting point metal valves 45a, 45b are configured with different melting points for each nozzle, among the two low melting point alloys, the low melting point alloy having the lower melting point first melts and sprays the jet of coolant earlier. In most cases, the temperature of the battery cell 30 may be lowered and thermal runaway may be delayed through the first coolant spray. Accordingly, it is possible to respond to thermal runaway at the early stage, thereby preventing the thermal runaway from propagating rapidly and preventing fires.

However, in case the temperature drop of the battery cell 30 is insufficient by the first coolant spray or the temperature of the battery cell 30 increases further for some reasons, second coolant spray is performed when the temperature of the battery cell 30 reaches the melting point of the low melting point alloy having the higher melting point among the two low melting point alloys. As described above, multiple coolant spray is accomplished in response to the temperature rise of the battery cell 30, and the valve opening is accomplished by the mechanical operation attributed to the temperature of the battery cell 30 without the need for a separate electronic control unit for opening the valve.

According to the present disclosure, the low melting point metal valves 45a, 45b as the operation means are opened only in the event of the transition to an abnormal operation state in which the temperature of the battery cell 30 reaches the melting point of the low melting point metal. Accordingly, the opening of the low melting point metal valves 45a, 45b is an essential requirement for the coolant spray, and the coolant spray is carried out only when the battery cell 30 goes into the abnormal operation state. Accordingly, it is possible to minimize the faulty or incorrect coolant spray without an electronic control unit.

According to the present disclosure, it is possible to achieve multiple cooling in response to the temperature rise of the battery cell 30, thereby delaying thermal runaway. As described above, the present disclosure provides a safety device capable of delaying the occurrence of fires in the event of thermal runaway of the battery cell 30 disposed in the battery module 10. Accordingly, it is possible to improve safety that has been pointed out as the problem of the conventional lithium secondary battery, and in particular, the safety improvement effect is prominent in the battery module or the battery pack used in electric vehicles.

The present disclosure proposes mounting a plurality of coolant jet spray nozzles, and in this embodiment, two coolant jet spray nozzles 40a, 40b to spray the jet of coolant into the battery module 10, and connecting the coolant jet spray nozzles 40a, 40b to the coolant tanks 50a, 50b, respectively, and mounting the low melting point metal valves 45a, 45b having different melting points at the inlets of the coolant jet spray nozzles 40a, 40b, respectively. As the temperature of the battery cell 30 rises, each low melting point metal valve 45a, 45b is opened in a sequential order and coolant spray from multiple jet spray nozzles is accomplished, thereby achieving multiple cooling. Accordingly, in the event of thermal runaway of the battery cell, it is possible to prevent the thermal runaway propagation and delay the occurrence of fires.

At least two coolant jet spray nozzles may be provided. For example, each of a first low melting point metal valve having the melting point of 70° C. and a second low melting point metal valve having the melting point of 90° C. may be mounted in the coolant jet spray nozzle. When the temperature of the battery cell reaches 70° C., the first low melting point metal melts, the first low melting point metal valve is opened, and the inlet of the coolant jet spray nozzle having the first low melting point metal valve is opened to spray the jet of coolant. As described above, at the first temperature, the first low melting point metal melts, and the coolant jet spray nozzle having the first low melting point metal valve sprays the coolant the first time to suppress the temperature rise. If and when the temperature of the battery cell increases further and reaches the second temperature at 90° C., the second low melting point metal melts, the second low melting point metal valve is opened, and the inlet of the coolant jet spray nozzle having the second low melting point metal valve is opened to spray the jet of coolant.

The present disclosure may increase the number of low melting point metal valves having different melting points to two or more, for example, 3, 4, 5, in a sequential order, and the melting point of each low melting point metal valve may be in a sequentially increasing relationship. In this way, it is possible to achieve coolant spray from multiple nozzles in response to the rising temperature. This configuration implements a temperature down system for each thermal runaway stage and provides time delay and propogates trigger removal effects.

For example, although the first temperature is 70° C. and the second temperature is 90° C. in the previous example, the battery module may further include a coolant jet spray nozzle including a third low melting point metal valve having the melting point of 110° C. as a third temperature. The battery module according to the present disclosure includes the first low melting point metal valve that melts when the first temperature is reached, the second low melting point metal valve that melts when the second temperature is reached, and the third low melting point metal valve that melts when the third temperature is reached, and the first temperature to the third temperature may be in a sequentially increasing relationship.

As another example, the battery module may further include a coolant jet spray nozzle including a fourth low melting point metal valve having the melting point at a fourth temperature of 120° C. that is higher than the third temperature. The temperature drop effect will be described with reference to FIGS. 3 and 4.

Figure 3:
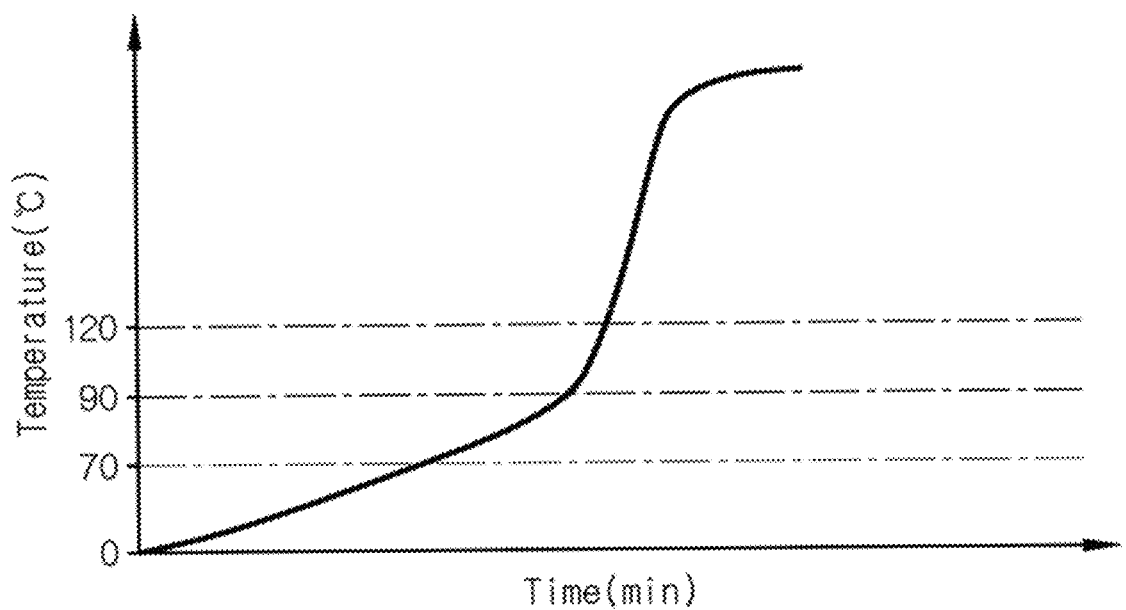
FIG. 3 shows an example of a battery cell temperature rise in the conventional battery module.

FIG. 3 shows an example of a battery cell temperature rise in the conventional battery module. When the battery module is not configured for multiple cooling as opposed to the present disclosure, the battery cell temperature rises over time as shown in FIG. 3, resulting in thermal runaway.

Figure 4:
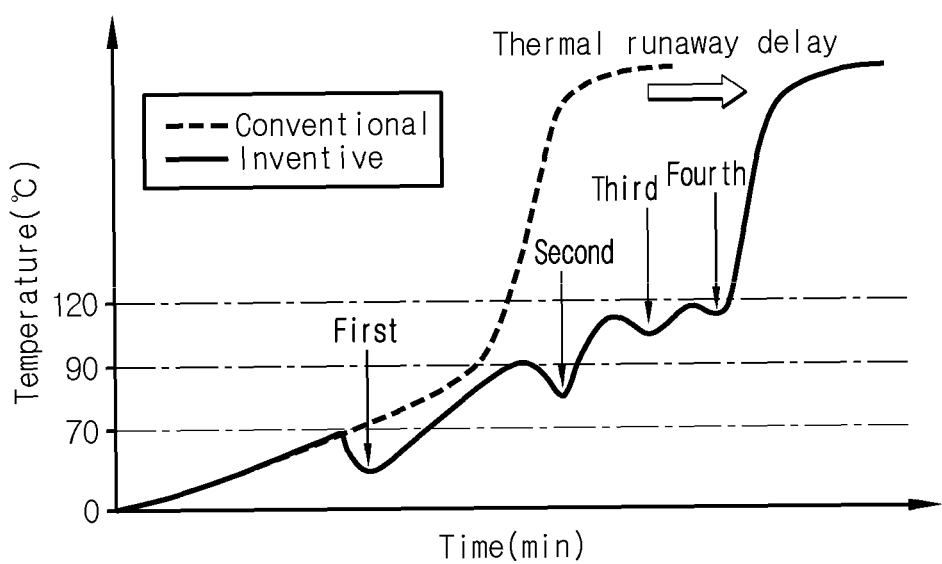
FIG. 4 shows an example of a battery cell temperature rise in a battery module according to another embodiment of the present disclosure.

FIG. 4 shows an example of a battery cell temperature rise in the battery module including the coolant jet spray nozzles having the first to fourth low melting point metal valves according to another embodiment of the present disclosure.

Referring to FIG. 4, when the temperature of the battery cell reaches 70° C., the first low melting point metal melts, the first low melting point metal valve is opened, and the inlet of the coolant jet spray nozzle having the first low melting point metal valve is opened to spray the first jet of coolant. As described above, at the first temperature, the first low melting point metal melts and the coolant jet spray nozzle having the first low melting point metal valve sprays the coolant to suppress the temperature rise.

If and when the temperature of the battery cell increases further and reaches 90° C., at the second temperature, the second low melting point metal melts, the second low melting point metal valve is opened, and the inlet of the coolant jet spray nozzle having the second low melting point metal valve is opened to spray the second jet of coolant. The temperature rise is suppressed by the second coolant spray.

If and when the temperature of the battery cell increases further and reaches 110° C., at the third temperature, the third low melting point metal melts, the third low melting point metal valve is opened, and the inlet of the coolant jet spray nozzle having the third low melting point metal valve is opened to spray the third jet of coolant. The temperature rise is suppressed again by the third coolant spray.

If and when the temperature of the battery cell increases further and reaches 120° C., at the fourth temperature, the fourth low melting point metal melts, a fourth low melting point metal valve is opened, and the inlet of the coolant jet spray nozzle having the fourth low melting point metal valve is opened to spray the fourth jet of coolant. The temperature rise is suppressed by the fourth coolant spray.

When comparing FIG. 3 with FIG. 4, the time point at which thermal runaway occurs in the conventional battery module of FIG. 3 may be delayed by a predetermined time in the battery module of the present disclosure shown in FIG. 4. As described above, the present disclosure may delay the occurrence of thermal runaway of the battery cell in the battery module, and when thermal runaway occurs, may delay the thermal runaway propagation, thereby mechanically delaying the occurrence of fires.

Meanwhile, the melting point of the low melting point metal is presented in the embodiments by way of example, and the melting point may be differently designed. In general, it is known that the threshold temperature leading to thermal runaway is about 150° C. The low melting point metal of the low melting point metal valve used in the present disclosure has the melting point that is equal to or lower than the threshold temperature.

Figure 5:
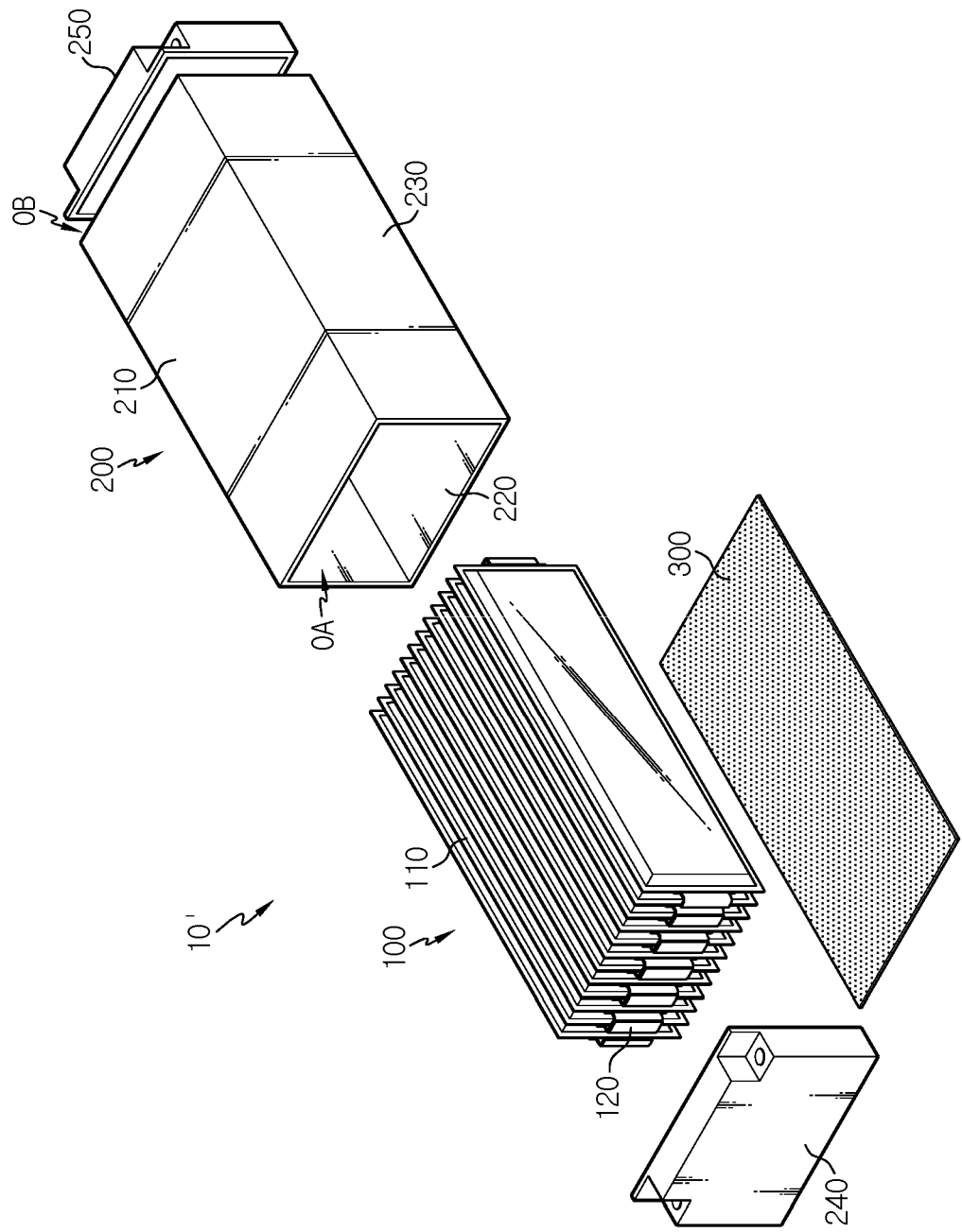
FIG. 5 is an exploded view illustrating a battery module according to still another embodiment of the present disclosure.
Figure 6:
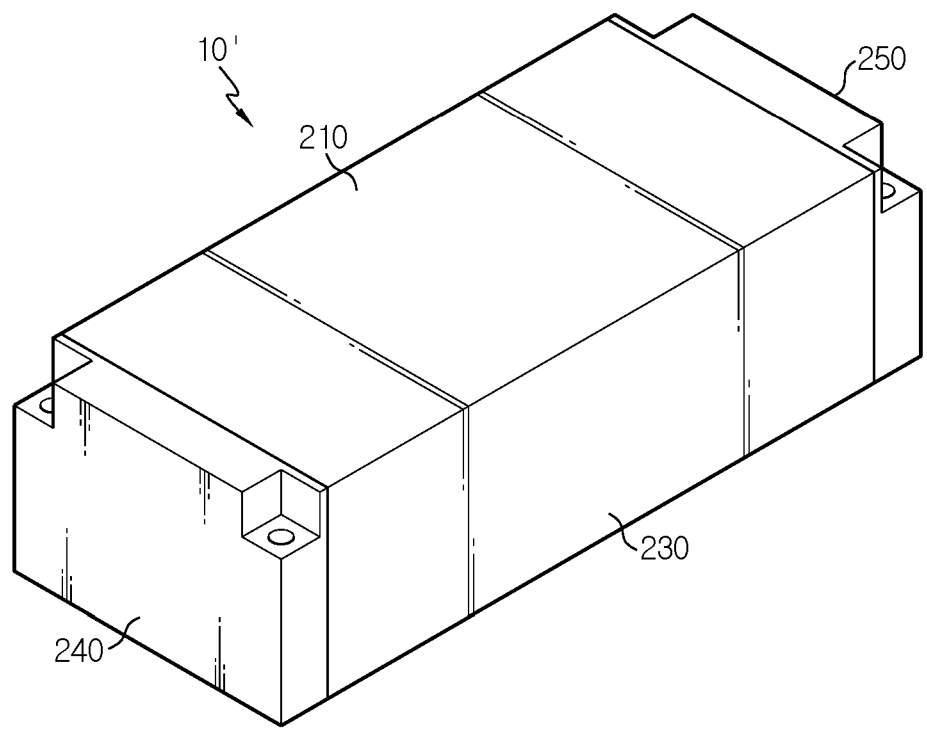
FIG. 6 is an assembled perspective view of FIG. 5.

FIG. 5 is an exploded perspective view for describing a battery module according to still another embodiment of the present disclosure. FIG. 6 is an assembled perspective view of FIG. 5.

The multiple cooling method described with reference to FIG. 1 brings a better result when used in the battery module of FIG. 5.

Referring to FIGS. 5 and 6, the battery module 10 includes a battery cell assembly 100, a module case 200 and a thermally conductive adhesive 300.

The battery cell assembly 100 may include at least one battery cell 110. The plurality of battery cells 110 may be stacked in electrical connection with each other. The plurality of battery cells 110 in a plate shape may be stacked and arranged such that one or two surfaces are in contact with the adjacent battery cells to form the battery cell assembly 100, and each battery cell 110 may have an electrode lead 120 extending from one or two sides and may be stacked along the horizontal direction (i.e., between side plates 230) of the module case 200 such that the edge where the electrode lead 120 is not extended faces down toward bottom plate 220). That is, the battery cell 110 may stand vertically such that the wide surface is not placed on the bottom and be stacked side by side to form the battery cell assembly 100. In this instance, the electrode lead 120 may be placed on the left side and the right side of the battery cell assembly 100.

In particular, the plate-shaped battery cell may be a pouch type battery cell including an electrode assembly embedded in a battery case of a laminate sheet including a resin layer and a metal layer, sealed along the outer periphery of the battery case by heat melting.

In detail, the plate-shaped battery cell may be a pouch type battery cell including an electrode assembly including a positive electrode, a separator and a negative electrode and an electrolyte solution hermetically received in a battery case, and may have a plate shape of an approximately cuboidal structure having a small thickness to width ratio. In general, the pouch type battery cell includes a pouch type battery case, and the battery case has a laminate sheet structure including (i) an outer coating layer made of polymer resin having high durability, (ii) a barrier layer made of a metal material capable of preventing the inflow of moisture and air, and (iii) an inner sealant layer made of polymer resin that melts when heated, stacked in that order. In the pouch type battery cell, the battery case may be formed in various structures.

The module case 200 has an empty space inside. The module case 200 receives the battery cell assembly 100. The module case 200 is provided with at least one open surface to insert the battery cell assembly 100 through the opening. The module case 200 may be provided in the shape of a cuboid as a whole. For example, the module case 200 may be provided in a tubular rectangular shape with two opposing open sides.

The module case 200 includes a top plate 210 to cover the top of the battery cell assembly 100, a bottom plate 220 positioned opposite the top plate 210 to cover the bottom of the battery cell assembly 100, and a pair of side plates 230 coupled to the top plate 210 and the bottom plate 220 and positioned on two sides of the battery cell assembly 100, and has a first opening OA and a second opening OB which are open to two sides in the lengthwise direction of the battery cells 110.

The top plate 210 may have a sufficient size and shape to cover the top of the battery cell assembly 100. The bottom plate 220 is provided with generally the same shape as the top plate 210, and can stably support the battery cell assembly 100. The pair of side plates 230 may have the same shape and size, facing each other.

The top plate 210, the bottom plate 220 and the side plates 230 may be connected by welding. For example, the top plate 210, the bottom plate 220 and the side plates 230 may be welded on the sides by friction stir welding such that their ends do not overlap and their edges come into contact with one another. In another example, the top plate 210, the bottom plate 220 and the side plates 230 may be bonded to one another, may be integrally formed, or may be coupled together with a hinge structure. As described above, the module case 200 may be a mono frame.

The bottom plate 220 may further include, on the upper surface, a guide structure to which the battery cell assembly 100 is inserted and fixed. The guide structure and the battery cell 110 may be coupled by a sliding method. That is, a part of the battery cell 110 may be inserted into and coupled to the guide structure. For example, a melted part (a sealing part) of the battery cell 110 may be inserted into the guide structure. The plurality of groove-shaped guide structures may be provided. The number of guide structures corresponding to the number of battery cells 110 may be provided. When the battery cell 110 is inserted into the guide structure, the battery cell 110 may be supported more stably.

The module case 200 may further include a front cover 240 coupled to the first opening OA of the module case 200 and configured to cover the front side of the battery cell assembly 100, and a rear cover 250 coupled to the second opening OB of the module case 200 and configured to cover the rear side of the battery cell assembly 100.

The module case 200 is made of a thermally conductive material to serve to absorb the heat from the battery cell assembly 100 and dissipate the heat. The module case 200 may be made of a metal material. Since the metal material has good thermal conductivity, the module case 200 may perform the heat radiation function as a whole. For the material of the module case 200, all metal materials may be used, and when considering thermal conductivity, processing and cost, it is desirable to use SUS- or aluminum-based materials.

A thermally conductive adhesive 300 is interposed between the inner lower surface of the module case 200 and the lower side of the battery cell assembly 100. The thermally conductive adhesive 300 is an adhesive for cooling that can conduct heat, and may include thermal resin. The thermal resin is not limited to a particular type, but may be one of a thermally conductive silicone-based bond, a thermally conductive acrylic bond or a thermally conductive polyurethane bond. The thermally conductive adhesive 300 may fix the edges of the battery cells 110 to the inner lower surface of the module case 200 more stably.

Additionally, it is possible to cool through the lower side of the battery cell assembly 100. To this end, a heat sink may be disposed below the module case 200. The heat sink uses an edge cooling method and may be mounted below the module case 200 opposite the edges of the battery cells 110. The heat sink may have a space in which a vapor or liquid coolant may flow, and have a metal outer wall that defines the space.

In the assembly process, the battery cell assembly 100 is received in the module case 200 through the first opening OA of the module case 200. In this instance, the battery cell assembly 100 may be received in the module case 200 with the thermally conductive adhesive 300 applied to the lower side of the battery cell assembly 100, and after the assembly process is completed, a thermally conductive adhesive may be inserted into the module case 200 to form the thermally conductive adhesive 300.

After the battery cell assembly 100 is received in the module case 200, the front cover 240 is coupled to the first opening OA of the module case 200 and covers the front side of the battery cell assembly 100. The front cover 240 may form a front side of the battery module 10'. After the battery cell assembly 100 is received in the module case 200, the rear cover 250 is coupled to the second opening OB of the module case 200 and covers the rear side of the battery cell assembly 100. The rear cover 250 may form a rear side of the battery module 10'.

As described above, the front cover 240 and the rear cover 250 are positioned on the front and rear sides of the top plate 210 and the bottom plate 220 to cover the front and rear sides of the battery cell assembly 100. The front cover 240 and the rear cover 250 may be welded or bonded to the module case 200. Alternatively, the front cover 240 and the rear cover 250 may be detachably coupled to the module case 200.

As described above, the battery module 10' uses a tubular rectangular monoframe type module case 200, not the conventional cell cartridge. Conventionally, a cell cartridge in which the edge of the battery cell is inserted and fixed by press-fit is used. However, design of the present application solves the convention improves upon the design by transmitting the impacts or vibration to the edge of the battery cell that may occur during mounting when the edge of the battery cell is inserted into the cell cartridge. The battery module 10' and the battery pack including the same can protect the battery cell from external vibration very well, and thus they are advantageous in the application of vehicles that are frequently exposed to external vibration.

Additionally, the battery module 10' is completed by receiving the battery cell assembly 100 through the opening of the module case 200, followed by a simple operation of closing the openings on two sides. As described above, the battery module 10' is easily assembled, resulting in high process efficiency. Additionally, there is no need for a sealing component such as an O-ring, a cooling component such as a cooling pin, or a reinforcing or fixing component such as a cartridge, thereby reducing the number of components of the battery module 10'. Accordingly, it is possible to reduce the production cost and time and the weight, thereby improving productivity of the battery module 10'.

The battery module 10' also includes the coolant jet spray nozzles 40a, 40b and the coolant tanks 50a, 50b connected to each other as described with reference to FIGS. 1 and 2 to accomplish multiple-jet cooling using a melting point difference between the low melting point metal valves mounted in each coolant jet spray nozzle 40a, 40b.

The battery module 10' is an improved module of a simple structure including the battery cell assembly 100 and the module case 200 as the main elements, without the existing component such as a cell cartridge or a cooling pin, and configured for multiple-jet cooling to delay the occurrences of fires in the event of thermal runaway of the battery cell 110 in the battery module 10', thereby increasing safety.

Figure 7:
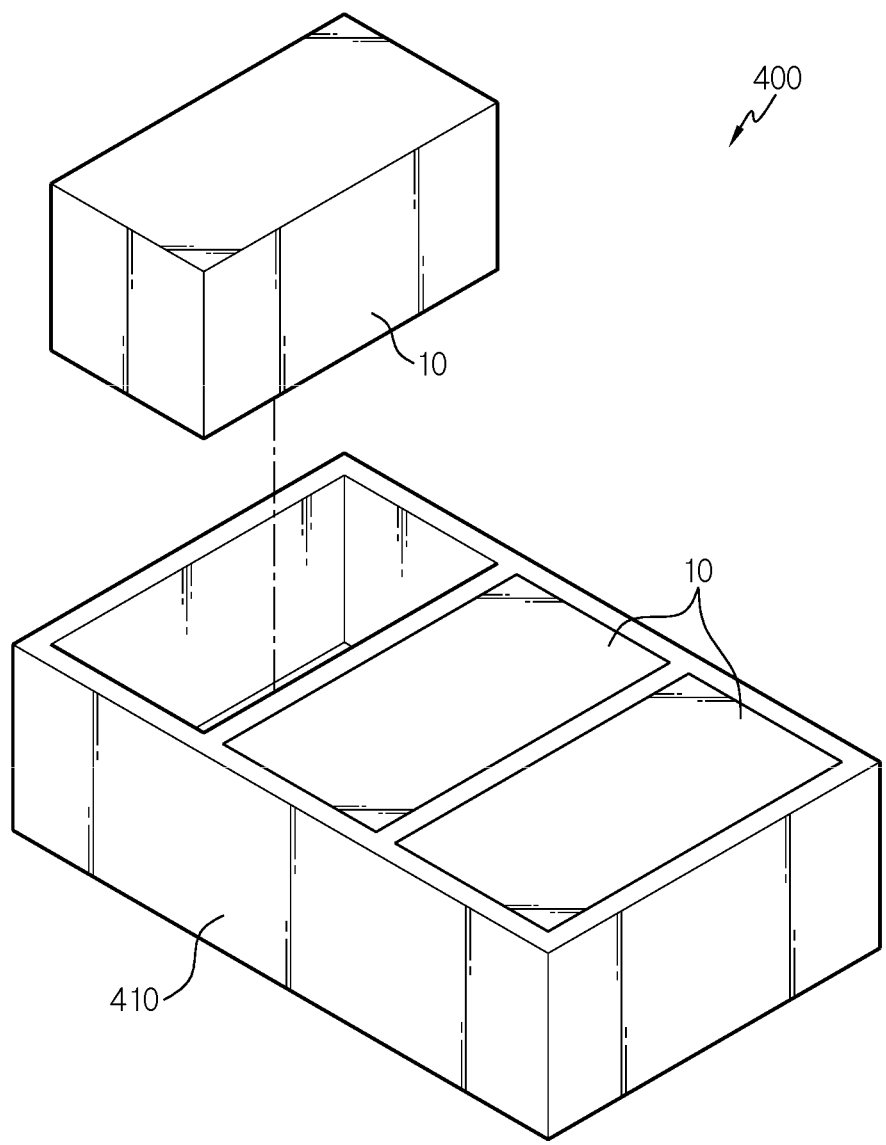
FIG. 7 is a schematic diagram of a battery pack according to an embodiment of the present disclosure.
Figure 8:
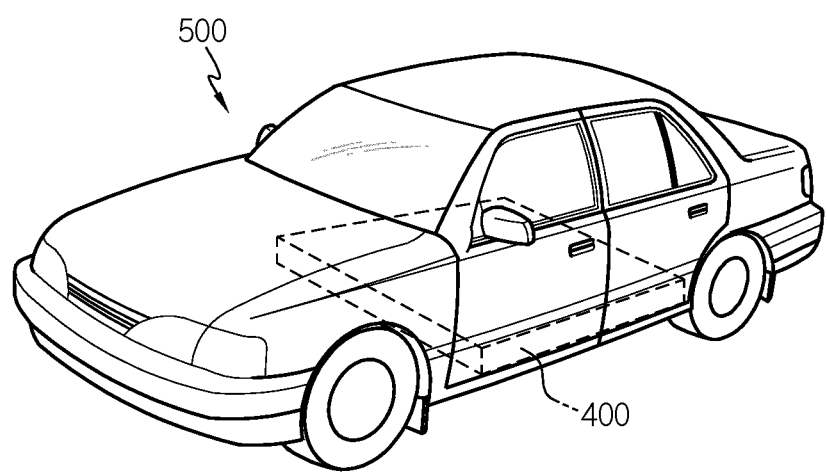
FIG. 8 is a schematic diagram of a vehicle according to an embodiment of the present disclosure.

FIG. 7 is a schematic diagram of a battery pack according to an embodiment of the present disclosure. The battery pack 400 is suitable for the use as battery packs for electric vehicles. FIG. 8 is a schematic diagram of a vehicle according to an embodiment of the present disclosure.

Referring to FIGS. 7 and 8, the battery pack 400 may include at least one battery module 10 according to the previous embodiment and a pack case 410 to package the at least one battery module 10.

Here, the at least one battery module may include the battery module 10' of the previous embodiment. In addition to the battery module 10 and the pack case 410, the battery pack 400 according to the present disclosure may further include various types of devices for controlling the charge/discharge of the battery module 10, for example, a BMS, a current sensor, a fuse or the like.

The battery module 10 is almost cuboidal and may be placed in arrangement inside the battery pack case 410, and each battery module 10 is connected to supply power necessary to drive the vehicle 500.

The battery pack case 410 is a container that fixes and receives the battery modules 10, and is in the shape of a cuboidal box. Additionally, the battery pack case 410 may be placed at a predetermined location inside the vehicle 500.

Preferably, the vehicle 500 may be an electric vehicle. The battery pack 400 may be used as an electrical energy source for supplying power to a motor of the electric vehicle 500 to drive the vehicle 500. In this case, the battery pack 400 has a high nominal voltage of 100V or above.

The battery pack 400 may be charged or discharged by an inverter by the operation of the motor and/or an internal combustion engine. The battery pack 400 may be charged by the regenerative charger coupled to the brake. The battery pack 400 may be electrically connected to the motor of the vehicle 500 through the inverter. Additionally, the battery pack 400 may be provided in any device, apparatus and equipment other than vehicles, such as Energy Storage Systems using secondary batteries.

The battery pack 400 according to this embodiment, and the device, apparatus and equipment including the battery pack 400, such as the vehicle 500, include the above-described battery module 10. Thus it is possible to implement the battery pack 400 having all the above-described advantages of the battery module 10 and the device, apparatus and equipment, such as the vehicle 500 including the battery pack 400.

It should be noted that the terms indicating directions as used herein such as upper, lower, front, rear, left and right are used for convenience of description, and it is obvious to those skilled in the art that the term may change depending on the position of the stated element or an observer.

While the preferred embodiments of the present disclosure have been hereinabove described, the present disclosure is not limited to the above-described particular preferred embodiments and it is obvious to those skilled in the art that various modifications and changes may be made thereto without departing from the subject matter of the present disclosure claimed in the appended claims, and such modifications and changes fall in the scope of the appended claims.

What is claimed is:

1. A battery module, comprising:
    a module case;
    at least one battery cell disposed in the module case;
    at least two coolant jet spray nozzles to spray a jet of coolant at the at least one battery cell; and
    coolant tanks coupled to the coolant jet spray nozzles,
    wherein a low melting point metal valve is coupled to an inlet of each coolant jet spray nozzle, respectively, and each low melting point metal valve has a corresponding metal with a different melting point than the metal of another one of the low melting point metal valves,
    wherein the melting points of the low melting point metal valves range from approximately 50° C. to 200° C.,
    wherein the melting points of the low melting point metal valves have a sequentially increasing relationship, and the low melting point metal valve are opened in a sequential order according to the different melting points as a temperature of the battery cell increases, thereby completing multiple coolant injections so that it is possible to prevent thermal runaway from propagating and delay an occurrence of fire.

2. The battery module according to claim 1, wherein each coolant jet spray nozzle has a distinct coolant tank coupled to the nozzle.

3. The battery module according to claim 1, wherein the coolant is a phase change liquid having insulating properties.

4. The battery module according to claim 1, wherein the low melting point metal valves include a first low melting point metal valve that melts when a first temperature is reached, a second low melting point metal valve that melts when a second temperature is reached and a third low melting point metal valve that melts when a third temperature is reached, wherein the first temperature, the second temperature and the third temperature are in the sequentially increasing relationship.

5. The battery module according to claim 4, wherein the low melting point metal valves further include a fourth low melting point metal valve that melts when a fourth temperature higher than the third temperature is reached.

6. The battery module according to claim 1, wherein the battery cell includes a plurality of plate-shaped battery cells, and the plurality of plate-shaped battery cells is stacked and arranged such that one or two surfaces of each plate-shaped battery cell are in contact with at least another adjacent one of the plate-shaped battery cells to form a battery cell assembly, each of the plate-shaped battery cells includes an electrode lead extending from one or two sides, and the battery cells are stacked along a horizontal direction between a pair of side plates of the module case such that an edge from which the electrode lead does not extend faces a bottom plate of the module case.

7. The battery module according to claim 6, further comprising:

a thermally conductive adhesive interposed between an inner lower surface of the module case and a lower side of the battery cell assembly.

8. The battery module according to claim 6, wherein the module case comprises:

a top plate to cover a top of the battery cell assembly;

the bottom plate positioned opposite the top plate to cover a bottom of the battery cell assembly; and the pair of side plates coupled to the top plate and the bottom plate, and positioned on two sides of the battery cell assembly, wherein the module case has a first opening and a second opening which are open on two opposing sides in a lengthwise direction of the battery cells, and wherein the module case further comprises a front cover coupled to the first opening of the module case and configured to cover a front side of the battery cell assembly, and a rear cover coupled to the second opening of the module case and configured to cover a rear side of the battery cell assembly.

9. A battery pack, comprising:

at least one battery module according to claim 1; and a pack case to package the at least one battery module.

10. A vehicle comprising at least one battery pack according to claim 9.

* * * * *